United States Patent [19]
Chaumont

[11] 3,754,798
[45] Aug. 28, 1973

[54] TRACK FOR SNOWMOBILE OR THE LIKE

[75] Inventor: Guy-Noel Chaumont, Tring-Jonction, Quebec, Canada

[73] Assignee: Dayco Corporation, Dayton, Ohio

[22] Filed: Mar. 2, 1971

[21] Appl. No.: 120,159

[52] U.S. Cl. .................................. 305/38, 305/52
[51] Int. Cl. ............................................ B62d 55/24
[58] Field of Search .................. 305/35 EB, 38, 52, 305/18

[56] References Cited
UNITED STATES PATENTS

| | | | |
|---|---|---|---|
| 3,477,767 | 11/1969 | McNeil | 305/38 |
| 3,612,625 | 10/1971 | Huber | 305/38 |
| 2,012,958 | 9/1935 | Colby | 305/38 |
| 3,508,796 | 4/1970 | Paulson | 305/38 |
| 3,509,955 | 5/1970 | Lichfield | 305/38 |
| 3,658,392 | 4/1972 | Perreault | 305/24 |
| 3,690,741 | 9/1972 | Pierson | 304/38 |

FOREIGN PATENTS OR APPLICATIONS

| | | | |
|---|---|---|---|
| 462,126 | 7/1928 | Germany | 305/38 |
| 574,161 | 3/1924 | France | 305/35 EB |
| 28,979 | 1925 | France | 305/35 EB |

*Primary Examiner*—Richard J. Johnson
*Attorney*—Reuben Wolk

[57] ABSTRACT

The disclosure herein describes an endless flexible track for a snowmobile or the like which comprises at least two laterally spaced and longitudinally extending strips of elastomeric material, a plurality of equidistantly spaced reinforcing members incorporated in the strips and extending transversely thereof, and roller means rotatably mounted on the reinforcing members and defining between the strips at least one row of sprocket-teeth-receiving openings. This type of construction considerably diminishes wear due to friction between the sprocket teeth and the flexible track looped around the driving and idler sprockets.

7 Claims, 13 Drawing Figures

Patented Aug. 28, 1973

INVENTOR
Guy-Noel CHAUMONT

BY
Cushman, Darby & Cushman
ATTORNEYS

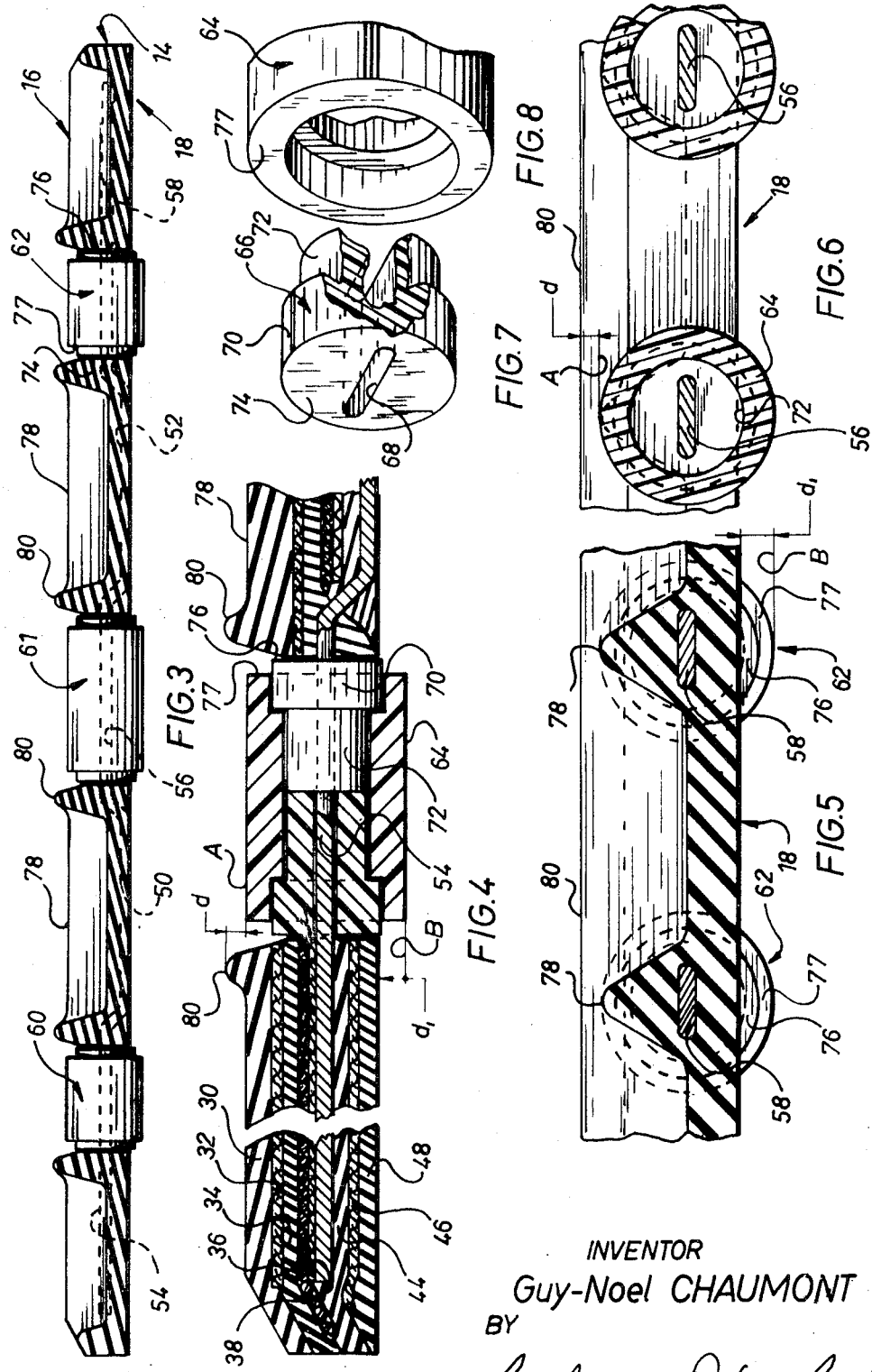

TRACK FOR SNOWMOBILE OR THE LIKE

The present invention relates to tracks for self-propelled vehicles; more particularly, this invention pertains to an improvement in the manufacture of an endless flexible track of the type normally used for driving snowmobiles or the like.

At present, the track used on this type of vehicle is commonly made of a thin and elastomeric material with a generally flat inner surface and a corrugated outer surface; the endless track is looped around a front driving sprocket and a rear idler sprocket, the teeth of which are received in a row of holes longitudinally extending through the track. Some vehicles are provided with a pair of driving sprockets and a pair of idler sprockets, in which case the track has two spaced rows of sprocket-teeth-receiving holes. In order to increase the rigidity of the track in its lateral extent to withstand the driving force of the sprocket teeth, lateral reinforcing rods are embedded, or partially embedded, in the elastomeric track. To prevent wear due to friction between the sprocket teeth and the elastomeric material, a wearing metal clip is usually crimped around the rubber material between adjacent holes; in some other cases, as described in Canadian Patent No. 833,436 issued Feb. 3, 1970 to Guy-Noel Chaumont, metal clips are embedded in the rubber material with front and rear portions providing wear surfaces. In each case, wear is inevitable due to the frictional contact between the sprocket teeth and the metal clips; furthermore, and especially in the former case, the metal clips, inevitably, are subject to corrosion and are often dislodged from the track.

It is an object of this invention to provide a track for snowmobiles or the like wherein the friction normally present when the track engages the front and rear sprocket teeth, is considerably diminished, thereby increasing the life and efficiency of the track.

The present invention relates to an endless driving track for use in a snowmobile or the like, comprising in its broadest aspect, at least two laterally spaced and longitudinally extending strips of flexible material having inner and outer peripheral surfaces, a plurality of equidistantly spaced reinforcing members incorporated in the strips and extending transversely thereof, and roller means rotatably mounted on the reinforcing members and defining with the spaced strips at least one row of sprocket-teeth-receiving openings extending longitudinally of the track.

Having thus generally described the nature of the invention, particular reference will be made to the accompanying drawings illustrating preferred embodiments thereof and in which:

FIG. 3 is a transverse cross-sectional view taken along lines 3—3 of FIG. 1;

FIG. 4 is a transverse cross-sectional view taken along lines 4—4 of FIG. 1;

FIG. 5 is a longitudinal cross-sectional view taken along lines 5—5 of FIG. 1;

FIG. 6 is a longitudinal cross-sectional view taken along lines 6—6 of FIG. 1;

FIG. 7 is a perspective view, partly cut away, of a coupling member used in conjunction with the reinforcing member shown in FIG. 2;

FIG. 8 is a partial perspective end view of a rolling member used in conjunction with the coupling member shown in FIG. 7;

Figure 1:
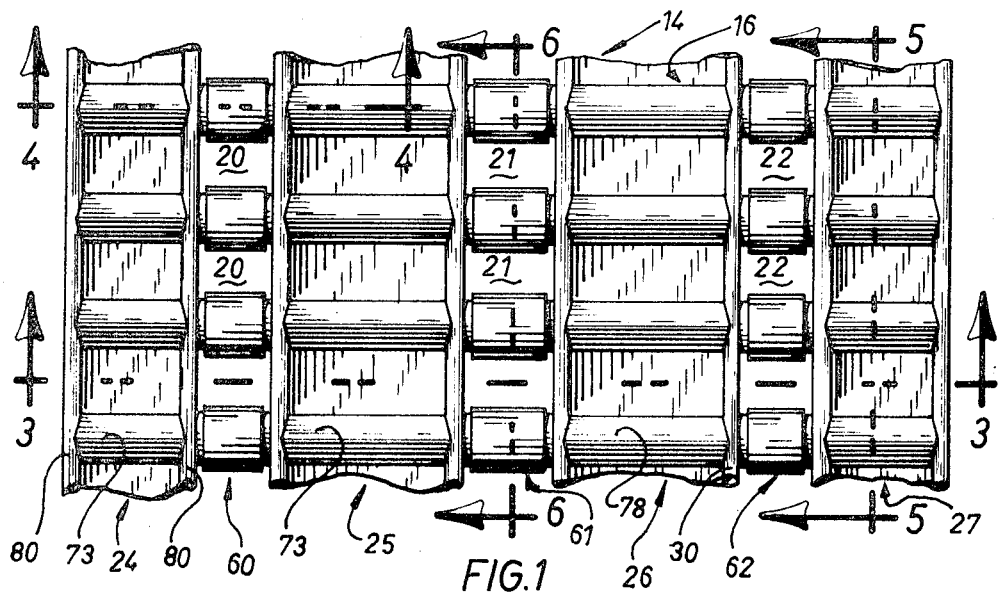
FIG. 1 is a fragmentary plan view of one form of a track constructed according to the present invention.
Figure 2:
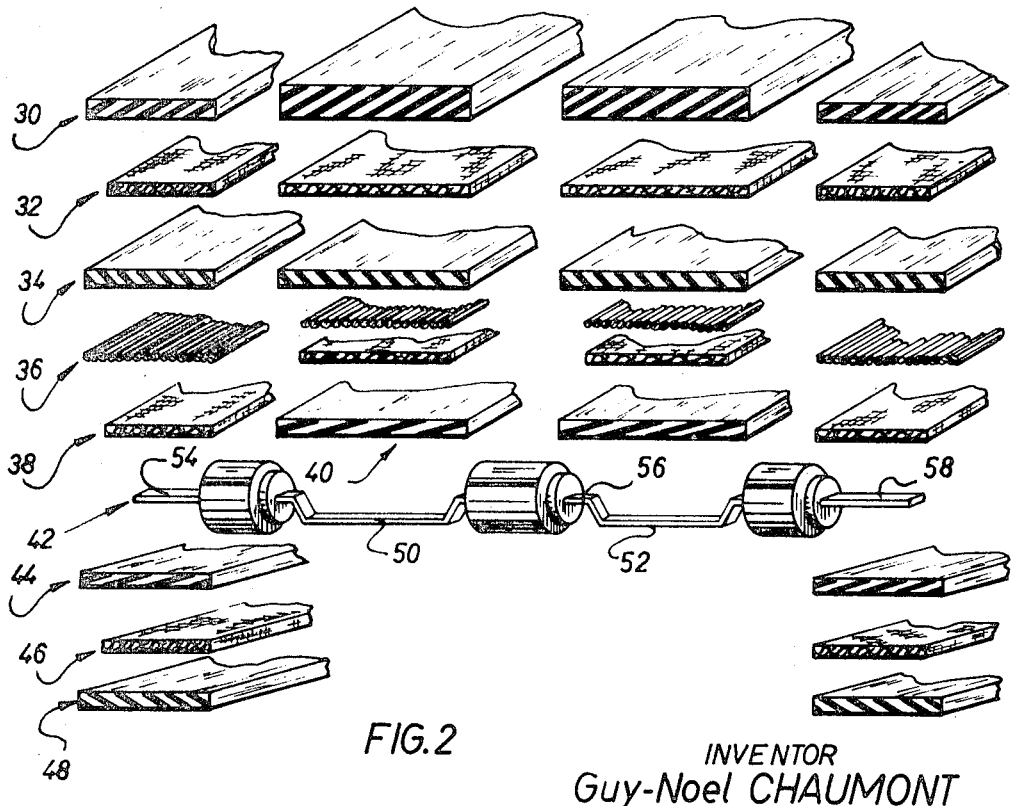
FIG. 2 is an exploded view showing the layup of a track similar to that shown in FIG. 1.

Referring to FIG. 1 of the drawings, a portion of an endless flexible track is shown and is generally denoted by the numeral 14. The track has an outer ground-contacting surface 16 provided with a tread, the configuration of which may adopt various patterns of corrugation. The track has also an inner peripheral surface 18 (see FIG. 3) which is generally flat to receive the wheels of the snowmobile suspension assembly (not shown). The track illustrated in FIG. 1 displays three laterally spaced rows of aligned sprocket-teeth-receiving openings 20, 21 and 22 which extend longitudinally of the track and divide the track in four longitudinally extending strips 24, 25, 26 and 27. The track is made of elastomeric material; FIG. 2 shows a typical layup for forming such a track. An outer layer 30 is of rubber followed by a layer of woven nylon 32, a second layer of rubber 34, a layer of longitudinally extending steel cables 36 and a second layer of woven nylon 38; the central portion of the track further includes another layer of rubber 40. A reinforcing member 42 extends transversely of the track. The longitudinal edge portions of the track further includes, underneath the opposite ends of the reinforcing member 42, a third layer of rubber 44 followed by a third layer of woven nylon 46 and a fourth layer of rubber 48. The particular construction of a track similar to the one shown in FIG. 2 is the subject of a co-pending application filed by applicant concurrently herewith. It is therefore wished to have it understood that the present invention, as hereinafter described, is not limited to the particular construction of the track shown in FIG. 2, nor is it limited to any particular tread design for the outer surface of the track.

In FIGS. 2-6, the reinforcing member 42 shown is a flat rigid bar of rectangular cross-section and with two midportions 50 and 52 offset relative to three raised portions 54, 56 and 58. The offset prevents any lateral movement of the reinforcing member once molded in the elastomeric material. However, the shape of the reinforcing member 42 may be modified in various ways, for instance, the reinforcing member may be completely or partially embedded in the elastomeric material; it is therefore wished to have it understood that, again, the present invention is not limited to the particular shape of the reinforcing member shown in the drawings.

The essential feature of the present invention consists in mounting roller means on each reinforcing member in the one or more rows of openings of the track, thereby considerably reducing wear due to friction between the sprocket teeth and the track. These roller means are cylindrically shaped members and are made of nylon, polycarbonate, polyurethane or other like suitable material.

In the construction of the track illustrated in FIGS. 3–6, roller means 60, 61 and 62 are mounted to revolve on and about the raised portions 54, 56 and 58 of the reinforcing member 42 in the rows of openings 20, 21 and 22, respectively. Because the reinforcing member 42 is rectangular in cross-section, each of the roller means 60, 61 and 62, in this particular embodiment, consists of a tubular member 64 which is fitted for rotation over a pair of coupling members 66 received at oposite ends of the tubular member and fixed onto the reinforcing bar 42. Each coupling member 66 is cylindrically shaped and has a central opening 68 of a shape corresponding to that of the cross-section of the reinforcing member; the circular outer wall of each coupling member includes a flanged portion 70 of larger diameter than that of the remaining portion 72. The inner wall of tubular member 64 is shaped to correspondingly receive the flanged portion 70 and the smaller portion 72 of each coupling member 66. The material of the coupling members may be the same as that of the tubular members or may be any other suitable wear-resistant material. The edges 74 and 76 of each coupling member extend beyond the associated peripheral side surfaces 77 of the tubular member to distance the revolving member 77 from the elastomeric material.

As mentioned above, the outer surface 16 has a specific tread design molded therein. This design is defined, in the present track, by a series of transverse ribs 78 and longitudinal ribs 80 which provide the necessary traction in the longitudinal and transverse direction. To prevent wear and friction due to contact between the periphery of each roller with the ground surface, it is preferable to leave a clearance space $d$ between the apexes of the longitudinal ribs 80 and the plane A tangent to the outer peripheral surface of the rollers. The lower tangent plane B of the outer surface of the rollers may extend a distance $d$ below the plane of the inner surface 18 of the track; such preferred construction will especially find advantageous applications in slide rail suspensions, such as schematically represented in FIG. 11 where the rollers act as support for the slide rails.

Figures 9, 10:
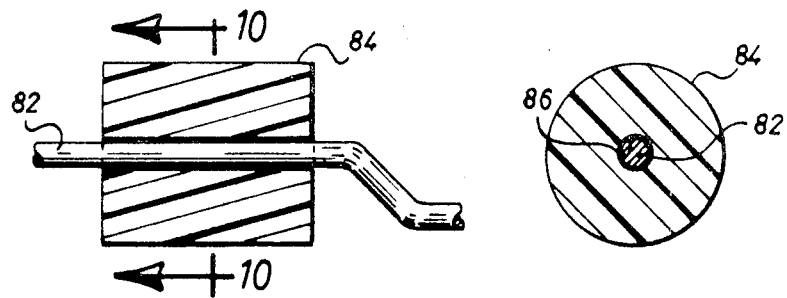
FIG. 9 is a cross-sectional view of another rolling member used in a track having a reinforcing member of circular cross-section.
FIG. 10 is a cross-sectional view taken along lines 10—10 of FIG. 9.

FIGS. 9 and 10 illustrate another embodiment of the invention in the case where the reinforcing member is a rod 82 circular in cross-section; it is therefore evident that the presence of coupling members, similar to those described above, are no longer required. The roller means are, in this case, revolving cylinders 84 with a circular central opening 86 axially extending therethrough to receive rod 82.

Figure 11:
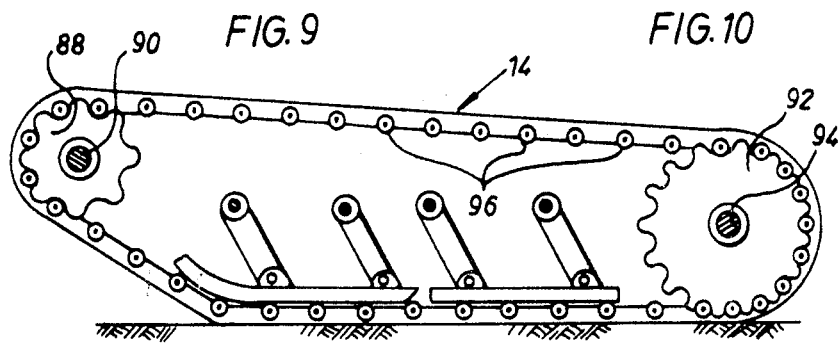
FIG. 11 is a schematic side view of the present track looped around an idler sprocket and a driving sprocket.

In the operation of the present track, reference is made to the schematic view of FIG. 11 wherein the track is looped around a driving sprocket 88 fixed onto a front driving axle 90 and around an idler sprocket 92 mounted on a rear axle 94; it can be seen that when rollers 96 are received between the teeth of the driving and idler sprockets, friction between the engaging surfaces of the respective members will considerably be diminished due to the rollers revolving about the reinforcing members when engaged and rotating with the sprocket teeth.

Figure 12:
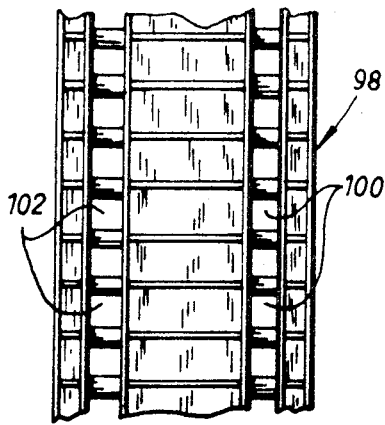
FIG. 12 is a fragmentary top plan view of another form of a track made in accordance with the present invention.
Figure 13:
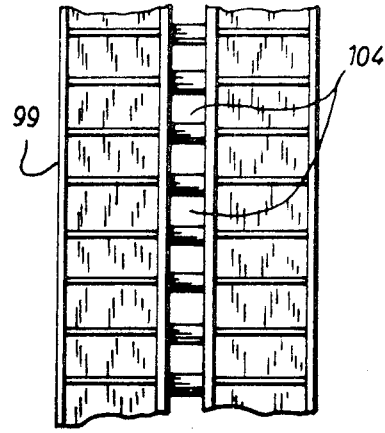
FIG. 13 is a fragmentary top plan view of another form of a track made in accordance with the present invention.

FIGS. 12 and 13 illustrate that the present invention is also applicable to a track 98 having a pair of spaced rows of sprocket-teeth-receiving openings 100 and 102 or to a track 99 having a single row of openings 104.

The invention has been described above to show that it may be incorporated in various types of tracks and with various shapes of reinforcing members; it is therefore wished to have it understood that the present invention is not limited in interpretation and in scope except by the terms of the following claims.

What I claimed is:

1. An endless driving track for use in a snowmobile or the like comprising at least two laterally spaced and longitudinally extending strips of elastomeric material having inner and outer peripheral surfaces; a plurality of equidistantly spaced reinforcing members incorporated in said strips and extending transversely thereof; and roller means rotatably mounted on the reinforcing members and defining with said spaced strips at least one row of sprocket-teeth-receiving openings extending longitudinally of the track; each of said reinforcing members comprising a rigid bar of non-circular cross-section, said roller means including a tubular member having a circular opening and a pair of coupling members received in the opposite ends of said opening and fixedly mounted on said reinforcing member, said tubular member being rotatable relative to said coupling members, each of said coupling members having an axial opening extending therethrough for receiving said reinforcing member, the configuration of said axial opening of said coupling member corresponding to the cross-sectional shape of said reinforcing member.

2. An endless track as defined in claim 1, wherein said cross-sectional shape of said reinforcing member is rectangular.

3. An endless track as defined in claim 1, wherein peripheral side surfaces of said coupling members extend beyond related peripheral side surface of said tubular member.

4. An endless track as defined in claim 1, comprising two laterally spaced rows of sprocket-teeth-receiving openings and three longitudinally extending strips of elastomeric material.

5. An endless track as defined in claim 1, comprising three laterally spaced rows of sprocket-teeth-receiving openings and four longitudinally extending strips of elastomeric material.

6. An endless track as defined in claim 1, wherein said outer surface has a tread design defined by longitudinal and transverse ribs, said longitudinal ribs extending at least along said row of openings, the apexes of said longitudinal ribs adjacent said row of openings extending beyond the tangent plane of said roller means on the side of the outer surface of the track.

7. An endless track as defined in claim 6, wherein said inner surface is generally flat and wherein the tangent plane of the roller means on the side of said inner surface of the track extends beyond the plane of said inner surface.

* * * * *